United States Patent
Hassan

(10) Patent No.: US 7,444,162 B2
(45) Date of Patent: Oct. 28, 2008

(54) APPARATUS AND A METHOD FOR DISTRIBUTING A TRANSMISSION POWER IN A CELLULAR COMMUNICATIONS NETWORK

(75) Inventor: Rizwan Hassan, Middlesex (GB)

(73) Assignee: Samsung Electronics Co., Ltd (KR)

( * ) Notice: Subject to any disclaimer, the term of this patent is extended or adjusted under 35 U.S.C. 154(b) by 808 days.

(21) Appl. No.: 11/055,777

(22) Filed: Feb. 10, 2005

(65) Prior Publication Data

US 2005/0208960 A1    Sep. 22, 2005

(30) Foreign Application Priority Data

Feb. 10, 2004    (GB) .................................. 0402896.5

(51) Int. Cl.
H04Q 7/20        (2006.01)
H04Q 7/32        (2006.01)
(52) U.S. Cl. ......................... 455/522; 455/69; 455/517; 455/500; 455/67.11; 455/68; 370/345; 370/346; 370/347; 370/312; 370/313
(58) Field of Classification Search ................. 455/522, 455/69, 517, 501, 500, 68, 67, 11, 67.13, 455/423, 424, 425, 550.1, 445, 422.1, 403, 455/414.1, 414.2; 370/335, 337, 347, 346, 370/345, 343, 328, 329, 310, 312, 313

See application file for complete search history.

(56) References Cited

U.S. PATENT DOCUMENTS

| 6,212,364 | B1 | 4/2001 | Park |
| 2004/0023659 | A1 | 2/2004 | Xiao et al. |
| 2004/0110525 | A1* | 6/2004 | Black et al. .................. 455/522 |
| 2004/0248606 | A1 | 12/2004 | Suzuki et al. |
| 2005/0111391 | A1 | 5/2005 | Oki et al. |
| 2006/0040698 | A1* | 2/2006 | Shiu et al. .................... 455/522 |

FOREIGN PATENT DOCUMENTS

| EP | 1 225 710 | 7/2002 |
| EP | 1 365 520 | 11/2003 |
| EP | 1 531 557 | 5/2005 |
| WO | WO 03/098387 | 11/2003 |

OTHER PUBLICATIONS

Universal Mobile Telecommunications System (UMTS); Physical Layer Procedures (FDD), Dec. 2003.

* cited by examiner

Primary Examiner—Keith T Ferguson
(74) Attorney, Agent, or Firm—The Farrell Law Firm, PC

(57) ABSTRACT

A mobile terminal for use in a cellular communications network the terminal being adapted to: i) if the terminal transmits signals at a power below the maximum uplink transmission power, distributing the available uplink transmission power between different channels according to a first scheme; and ii) if the terminal transmits signals at a power exceeding or about to exceed the maximum uplink transmission power, distributing the available uplink transmission power between different channels according to a second scheme different from said first scheme.

21 Claims, 3 Drawing Sheets

APPARATUS AND A METHOD FOR DISTRIBUTING A TRANSMISSION POWER IN A CELLULAR COMMUNICATIONS NETWORK

PRIORITY

This application claims priority to an application entitled "An Apparatus And A Method For Distributing A Transmission Power In A Cellular Communications Network", filed in the United Kingdom Patent Office on Feb. 10, 2004 and assigned Ser. No. 0402896.5, the contents of which are incorporated herein by reference.

BACKGROUND OF THE INVENTION

1. Field of the Invention

This invention relates to the field of power control in mobile communications networks. More particularly, but not exclusively, the invention relates to control of the uplink transmission power.

2. Description of the Related Art

A user equipment (UE) for the use in cellular communications networks such as the Universal Mobile Telecommunications System (UMTS) has a limited amount of power resources available for transmitting user and control data in the uplink direction to the base stations of the network. Also, the network may limit the UE power allowed to transmit in the uplink direction in order to ensure that the signal achieves a predetermined signal-to-noise ratio.

The allowed or available uplink transmission power may be shared by a number of channels transmitted at the same time. In macro cell coverage scenarios, under deep fades or at the edge of the cell, the UE may often have to operate at or near maximum transmission power.

In case the UE detects that it may have a power problem such as it is required to serve multiple channels with a total transmission power exceeding the available or allowed uplink transmission power, there are two mechanisms foreseen in UMTS to handle such power "shortages".

The first mechanism is the so-called long-term behaviour. By applying the long-term mechanism, the UE is controlling the data rate used for uplink transmission power.

In UMTS, the network allocates a range of suitable bit rates or transport formats to the UE. The UE selects an appropriate transport format from the allowed set according to its buffer occupancy and power availability.

If the UE is running low on power, then the UE will reduce its data rate by selecting a lower data rate transport format. For example, if a UE is running low on power at the edge of a cell, it will eliminate certain allowed Transport Format Combinations (TFCs) from the set of allowed TFCs given by the network. In this manner, the UE will try to avoid a power problem by selecting an appropriate transport format corresponding to a lower data rate at the beginning of the next transmission frame.

The long term mechanism used in UMTS is described in more detail in the $3^{rd}$ Generation Partnership Project (3GPP) Specifications, see section 11.4 of the 3GPP TS 25.321, "*Technical Specification Group Radio Access Network; Medium Access Control (MAC) protocol specification*" and section 6.4 of 3GPP TS 25.133, "*Technical Specification Group Radio Access Network; Requirements for Support of Radio Resource Management (FDD)*".

The second mechanism is the so-called short-term behaviour. The UE will apply the short-term behaviour when the UE is already experiencing a power problem such as described above. In this mechanism the uplink transmission power is scaled down such that the maximal transmission power is not exceeded. This mechanism can be applied directly for transmission in the next slot rather than at the beginning of the next transmission frame as in the case of the above described long term behaviour.

The introduction of multiple parallel services such as those available in UMTS has made things even more challenging. In Release 5 of the 3GPP specifications, a High Speed Downlink Packet Access (HSDPA) feature is introduced which supports high data rate transmission in downlink direction. See the 3GPP specification TS 25.308, "*High Speed Downlink Packet Access (HSDPA), Overall Description*" for more details. However, this service requires transmission of signalling data in the uplink direction using a new physical channel, the so-called High Speed-Dedicated Physical Control Channel, HS-DPCCH. The impact of this could be a significant addition of power strain on the UE. The power requirement for transmission on the HS-DPCCH could be as high as 20-30% of the total available power. This means that HSDPA capable UE's will have higher probability of experiencing a power problem.

SUMMARY OF THE INVENTION

It is an object of the present invention to improve the mechanisms to control uplink transmission power of a UE in a cellular communications network.

According to a first aspect of the present invention, there is provided a mobile terminal for use in a cellular communications network the terminal being adapted to: i) if the terminal transmits signals at a power below the maximum uplink transmission power, distributing the available uplink transmission power between different channels according to a first scheme; and ii) if the terminal transmits signals at a power exceeding or about to exceed the maximum uplink transmission power, distributing the available uplink transmission power between different channels according to a second scheme different from said first scheme.

In this way the uplink transmission power of a UE can be controlled such that a loss of performance, particularly for some channels, is less likely or avoided.

Preferably, the uplink transmission power is distributed according to the priorities of the channels.

In this way, important or "high priority" channels are less affected by an uplink transmission power problem of a UE. For example, on important channels, such as the Dedicated Physical Data Channel (DPDCH) or the Dedicated Physical Control Channel (DPCCH), no or only reduced loss of performance is expected for higher layer 3 Radio Resource Control (RRC) signalling or high priority application such as a voice call.

According to the prior art procedures, equal compression throughout all served channels is applied if a UE is experiencing power problems. This could, for example, result in loss of DCCH data, which is undesirable, as the overall impact on system performance due to loss in performance on the DCCH is greater than loss of data on, for example, the dedicated traffic channel (DTCH) or HS-DPCCH.

Preferably, in the first and second scheme gain factors are used to define the distribution of uplink transmission power between different channels and at least one of the gain factors of the second scheme is different to a corresponding gain factor of the first scheme.

In this way the existing mechanisms and "infrastructure" for distributing the available uplink transmission power between channels can be re-used for the second scheme.

According to a further aspect of the present invention, there is provided a network element of a cellular communications network, the network element being adapted to determine one or more parameters defining the distribution of uplink transmission power between different channels if the maximum uplink transmission power is exceeded or about to being exceeded, wherein at least one of said parameters are different to parameters defining the distribution if the maximum uplink transmission power is not exceeded.

According to a further aspect of the present invention, there is provided A method for an uplink data transmission in a communication system, including steps of: distributing transmission powers of each channels transmitted by a first transceiver side; monitoring whether a total transmission power of the first transceiver exceeds a maximum transmission power of the first transceiver or not, where the total transmission power of the first transceiver is a summation value of the transmission powers of each channels; re-distributing transmission powers of the each channels by scaling down a transmission power of a channel having a low priority, when the total transmission power of the first transceiver exceeds the maximum transmission power of the first transceiver; and transmitting the each channels to a second transceiver side through the re-distributed transmission powers.

BRIEF DESCRIPTION OF THE DRAWINGS

Embodiments of the present invention will now be described, by example only, with reference to the accompanying figures, whereby.

DETAILED DESCRIPTION OF THE PREFERRED EMBODIMENTS

Figure 1:
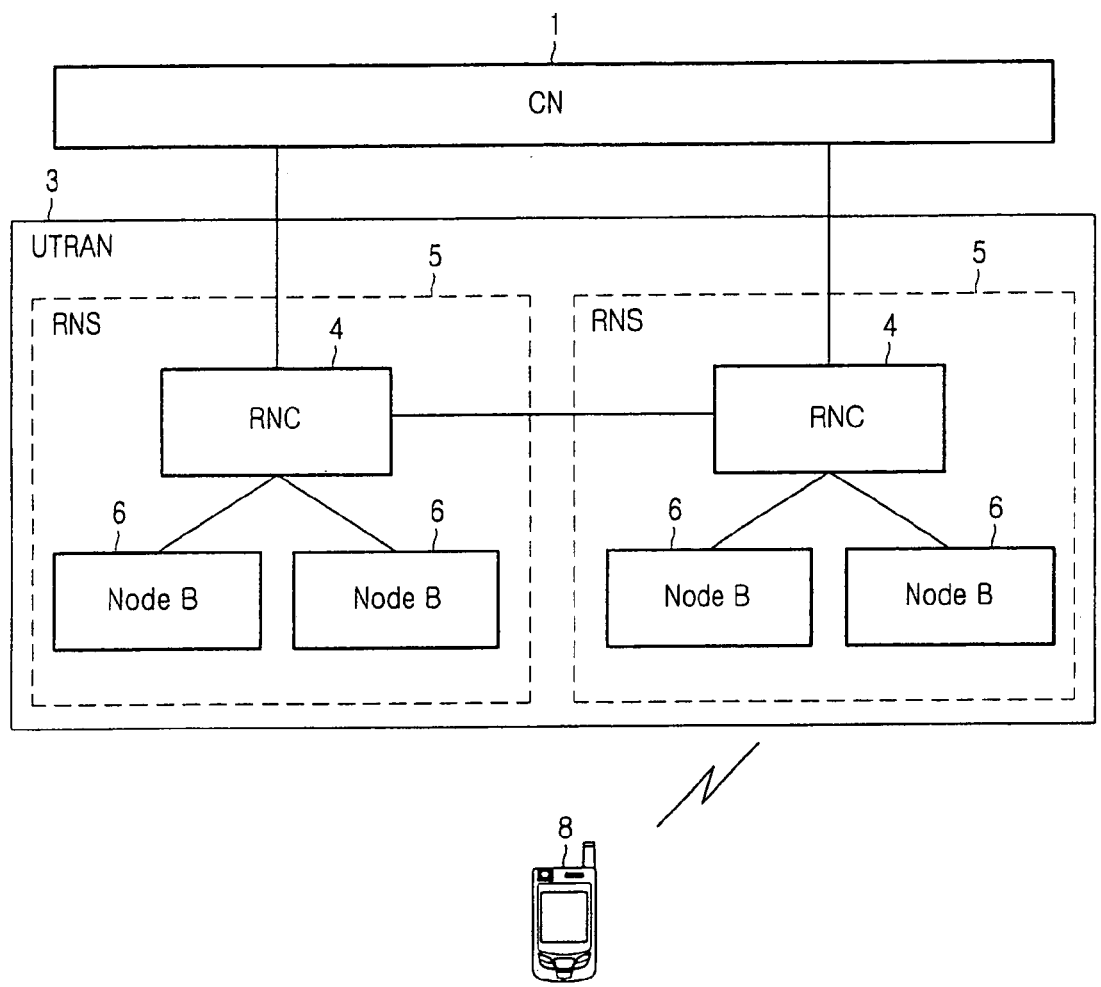
FIG. 1 is a schematic outline of a mobile telecommunications network, in which the present invention can be incorporated.

In FIG. 1 a schematic outline of a mobile telecommunications network according to the Universal Mobile Telecommunications System (UMTS) standard is shown. The typical architecture of such a network comprises mobile user equipments (UEs) 8, a UMTS Terrestrial Radio Access Network (UTRAN) 3 and one or more core networks (CNs) 1. UMTS is a third generation radio network using wideband code division multiple access (W-CDMA) technology.

The core network 1 may comprise Mobile Switching Centre (MSC) or Serving GPRS (General Packet Radio Services) Support Nodes (SGSN). The core network is connected via communication links to a number of Radio Network Controllers (RNCs) 4. The RNCs are dispersed geographically across areas served by the core network 1. Each RNC 4 controls one Radio Network Subsystems (RNSs) 5, including one or more base stations 6 such as "Nodes B" located remote from, and connected by further communication links to, the RNC 4. Each base station 6 transmits radio signals to, and receives signals from, user equipment or terminal 8 which is in an area served by that base station 6. The area is referred to as a "cell". A UMTS network is provided with a large number of such cells, which are ideally contiguous to provide continuous coverage over the whole network territory. See the UTRAN Overall Description, 3GPP TS 25.401, by 3GPP for more details.

Figure 2A:
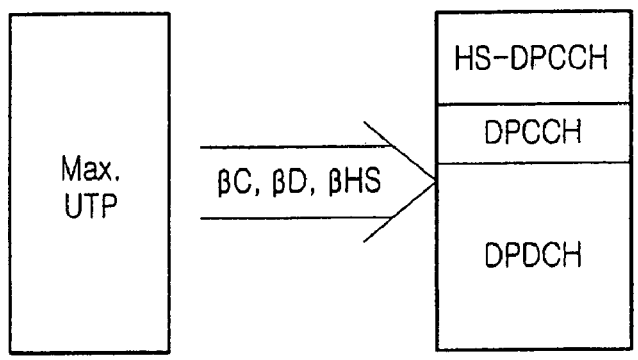
FIGS. 2A and 2B are schematic diagrams illustrating the distribution of uplink transmission power according to the prior art.
Figure 2B:
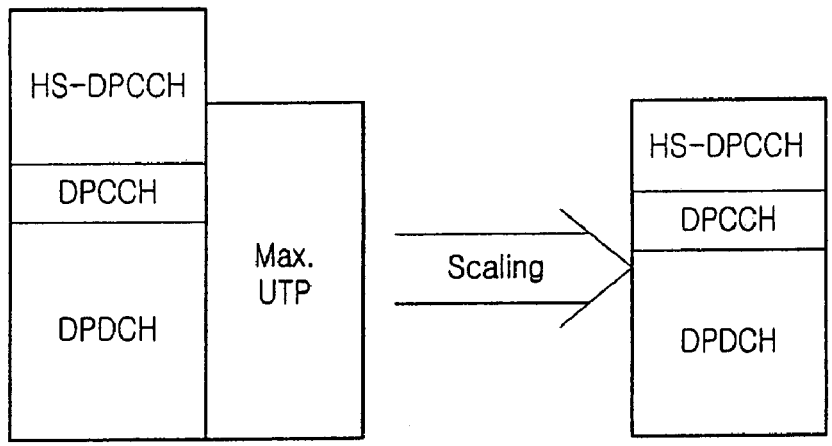

With reference to FIGS. 2A and 2B, the setting of the uplink power difference between the DPDCH, the DPCCH and the HS-DPCCH will be explained by a simplified example. More details may be found in the 3GPP "*Technical Specification Group Access Network; Spreading and Modification (FDD)*" TS 25.213 and the specification "*Physical Layer Procedures (FDD)*" TS 25.214.

In case of the 3GPP specifications, UE can simultaneously transmit a Dedicated Physical Data Channel (DPDCH) and a Dedicated Physical Control Channel (DPCCH) in Release 99, a High Speed-Dedicated Physical Control Channel (HS-DPCCH) in Release 5, and a Enhanced uplink Dedicated Physical Data Channel (E-DPDCH) and a Enhanced uplink Dedicated Physical Control Channel (E-DPCCH) in Release 6.

At this time, the total transmission power for the channels may exceed the maximum allowed uplink transmission power.

In this case, a UE must scale the total transmission power to level of the maximum allowed uplink transmission power.

In present invention, the UE monitors whether the total transmission power for the channels exceed the maximum allowed uplink transmission power or not. If the total transmission power for the channels exceed the maximum allowed uplink transmission power, The UE scales the total transmission power with reference to priorities of each channels. That is, the UE maintains the transmission power for the channels having relatively high priority and scales the transmission power for the channels having relatively low priority. A rule of priority assignment is as follow. That is, a priority of a voice channel is higher than a priority of a packet data channel, and a priority of a control channel is higher than a priority of a packet data channel.

In the present invention assumes that a DPCCH and a DPDCH have a first priority, a HS-DPCCH has a second priority, a E-DPCCH has a third priority, and a E-DPDCH has a lowest priority. Therefore, if the total transmission power for the channels exceeds the maximum allowed uplink transmission power, the UE scales the transmission power for the E-DPDCH or E-DPDCH and E-DPCCH having relatively high priority, while the UE maintains the transmission power for the other channels having relatively high priority. Herein, the mechanism can be operated per slot or sub frame or frame.

A detail operation of the present invention will be specified by referring to figures. In a following detail specification, the present invention assumes that the UE transmits simultaneously the DPCCH, the DPDCH and the HS-DPCCH, the priorities of the DPCCH and DPDCH are higher than the priority of the HS-DPCCH, the transmission power scaling is performed by resetting gain factors for each channels, a period of the transmission power scaling is a slot.

The maximum UE transmitter power is defined as the minimum of the maximum allowed uplink transmission power as set by the network and the maximum transmit power of the UE, see the 3GPP specification TS 25.133.

In order to distribute the maximum UE transmitter power between DPDCH, DPCCH and HS-DPCCH, so-called "gain factors" $\beta_C$, $\beta_D$ and $\beta_{HS}$ are used.

The UPLINK power ratio between the DPCCH and the DPDCH is defined by the gain factors $\beta_C$ and $\beta_D$ (i.e. by $\beta_C/\beta_D$), whereas the gain factor $\beta_{HS}$ defines the UPLINK power ratio between the HS-DPCCH and DPCCH.

These gain factors are generally determined by the network. $\beta_C$ is either signalled from the network element to the UE or calculated by the UE based on settings for a TFC, which are again signalled from network elements to the UE.

More details about the computation of the gain factors from TFC setting may be found in the 3GPP specification TS 25.214.

$\beta_{HS}$ is calculated by the UE from so-called offset-values $\Delta_{HS\text{-}DPCCH}$, which are again signalled by the network elements to the UE.

The HS-DPCCH carries acknowledgement and channel quality indication (CQI) signals. Usually three different power offset parameters are determined by the network, i.e. $\Delta_{ACK}$ and $\Delta_{NACK}$ for the acknowledgement signals and $\Delta_{CQI}$ for the quality indication signals; thus three different $\beta_{HS}$ factors may be computed by the UE from the power offset parameters signalled by the network; i.e. two for the acknowledgement messages and one for the CQI signals.

Referring now to FIG. 2A, a simplified example is illustrated. Here it is assumed that the maximum UE transmission power is 1 Watt, and the gain factors $\beta_C$ and $\beta_{HS}$ are set to:
$\beta_C$=0.33;
$\beta_D$=1.0;
$\beta_{HS}$=2.0.

Accordingly, the UE allocates the available uplink transmission power such that the DPDCH, DPCCH and HS-DPCCH transmits with the following powers:
$P_{DPDCH}$=0.5 Watt;
$P_{DPCCH}$=0.17 Watt;
$P_{HS\text{-}DPCCH}$=0.33 Watt.

If now the UE experiences, for example, a deep fade situation, the power required to transmit signals in all three channels with the same quality as before the deep fade situation would require an uplink power which is greater than the maximum UE transmission power (see FIG. 2B). However, as the maximum UE transmission power is limited as described above, the UE needs to limit the total UE transmission power to the maximum, UE transmission power.

According to one embodiment of the present invention, the network provides for additional gain factors $\beta'$ which the UE uses if it is about to exceed the maximum UE transmission power. The UE can apply the gain factors $\beta'$ at the beginning of the next slot.

By using a single set of gain factors and applying scaling if the UE is experiencing power problems, transmission power is suppressed equally for all served channels, possibly resulting in a loss of performance for all channels. However, the different channels have typically different priorities. For example, the priority of logical channels like DCCH carrying higher layer signalling is usually higher than for the other channels like DTCH or HS-DPCCH.

By the use of additional gain factors, the available uplink transmission power can be redistributed among the different channels if the UE experiences a power problem, and priorities of different channels can be taken into account.

In this way an improvement in performance of higher priority channels can be achieved.

In this case, the network provides the UE with a second set of offset values $\Delta_{HS\text{-}DPCCH}$, i.e., $\Delta'_{ACK}$, $\Delta'_{NACK}$ and $\Delta'_{CQI}$. The UE computes the gain factors $\beta'_{HS}$ in the same manner as $\beta_{HS}$ but using the offset-value $\Delta'_{HS\text{-}DPCCH}$ instead of $\Delta_{HS\text{-}DPCCH}$.

Alternatively, the network may signal a single offset-value $\Delta'_{HS\text{-}DPCCH}$, which is then used by the UE for transmitting acknowledgement and channel quality indication signals for the HSPDA service.

Figure 2C:
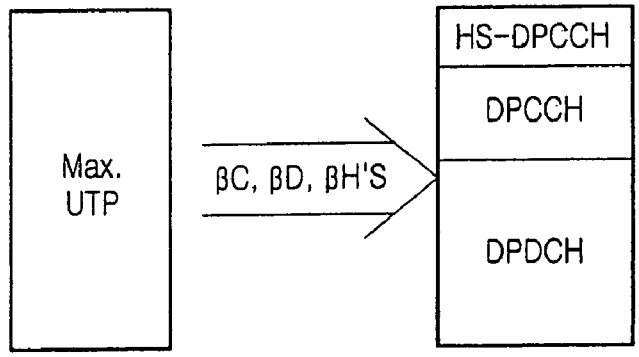
FIG. 2C is a schematic diagram illustrating the distribution of uplink transmission power according to one embodiment of the present invention.

Referring now to FIG. 2C, a simplified example of the use of gain factor $\beta'_{HS}$ is described.

The simplified example described above, is now extended and an additional gain factor $\beta'_{HS}$ is considered. It is again assumed that the maximum UE transmission power is 1 Watt, and the gain factors are set to:
$\beta_C$=0.33;
$\beta_D$=1.0;
$\beta_{HS}$=2.0;
$\beta'_{HS}$=0.5.

Accordingly, if the UE experiences a power problem, it allocates the available uplink transmission power using the additional gain factor $\beta'_{HS}$.

Thus, the UE allocates the available uplink transmission power such that the channel transmits with the following powers:
$P_{DPDCH}$=0.66 Watt;
$P_{DPCCH}$=0.22 Watt;
$P_{HS\text{-}DPCCH}$=0.11 Watt.

In this way the available power is distributed between the different channels such that the "high priority" channels receive more power compared to the lower priority channels. In case of a power problem in the uplink direction, the UE can thus use an additional power of 0.16 Watts and 0.06 Watts for uplink transmission on the DPDCH and DPCCH, respectively, compared to the case where no additional gain factor is provided.

It is noted that, by the use of the additional gain factor $\beta_{HS}'$, the power available for transmission on the HS-DPCCH is significantly reduced. Therefore, a possible loss in HSDPH performance may arise following the improvement in performance of higher priority channels. However, usually the above described long-term mechanism using TFC selection is applied as soon as power problems are foreseeable and thus the number of occasions in which the maximal uplink transmission power is to be exceeded is small. Hence, the overall loss in HSDPA performance is not expected to be significant.

Also, any possible effects of the UE transmitting with a reduced power for the HS-DPCCH are expected to be minor, as the mechanism for acknowledgement in the HSDPA service is very stable and the network may for example increase the number of repetitions in cases where it is known that the UE may often experiences a power problem.

Figure 3:
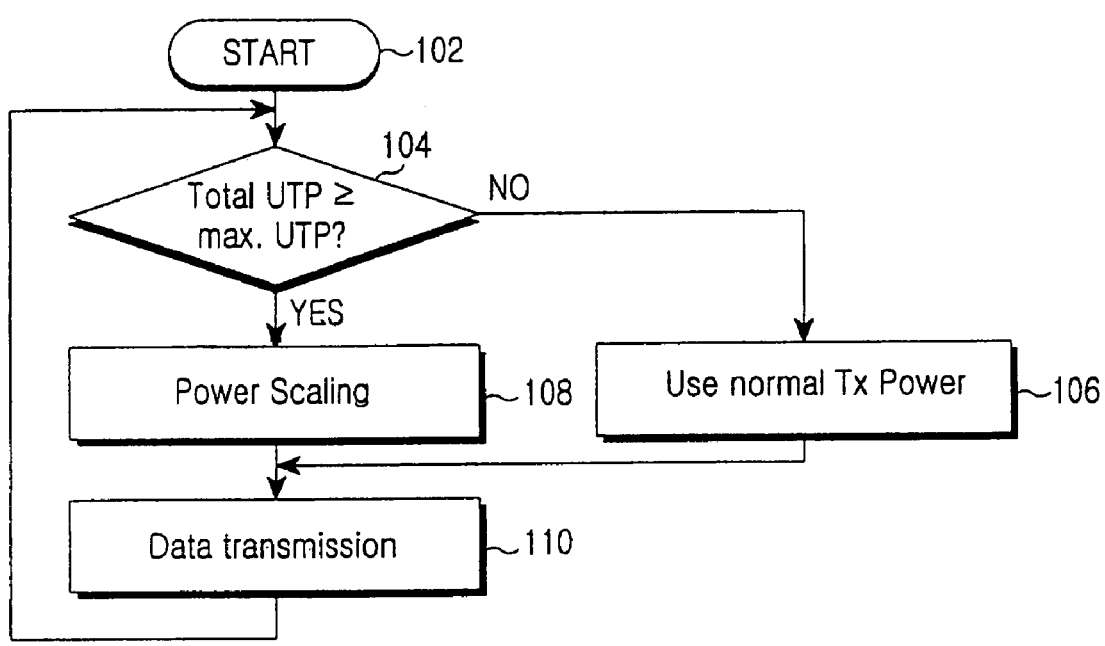
FIG. 3 is a flow chart illustrating the process of controlling uplink transmission power according to one embodiment of the present invention.

With reference to FIG. 3, the process of applying the different set of gain factors is now described.

The process starts in step 102, and the UE transmits uplink signals in different channels as required. Regularly, the UE determines whether it exceeds the maximal UE transmission power or whether it is about to exceed the maximal UE transmission power (step 104).

This is done by the UE measuring its transmitted power for a predetermined measurement period, usually for the duration of one slot. From this measurement the UE estimates whether it has reached the maximum allowed uplink transmission power, taking into account tolerances as defined for the UE transmitted power measurement accuracy in the 3GPP specification TS 25.133.

However, if the UE output power is outside the range covered by the UE transmitted power measurement, the UE determines whether it exceeds the maximum allowed uplink transmission power with more than the tolerances specified for the Open Loop Power Control in the 3GPP specification TS 25.101.

If it is determined in step 104 that the maximum UE transmission power is not exceeded, the UE applies the "normal" gain factors including $\beta_{HS}$ to set the power ratio between the different channels (step 106). If, on the other hand, it is detected in step 104 that the maximum UE transmission power is exceeded or is about to be exceeded, the process continues in step 108 by applying the gain factors provided for power problem situations. In order to set the power ratio between the DPCCH and the HS-DPCCH, the UE uses $\beta_{HS}'$ instead of $\beta_{HS}$. The UE uses the gain factors $\beta_{HS}'$ from the beginning of the current or next DPCCH slot.

In step 110 the UE transmits data using transmission power set on the step 106 or the step 108 and then again monitors the uplink transmission power on the step 104.

Whilst in the above mentioned embodiments transmission power control for UMTS systems has been described, it is appreciated that the present invention can be applied to other systems like for example GMS or other WCDMA systems in a similar way.

It is to be understood that the embodiments described above are preferred embodiments only. Various features may be omitted, modified or substituted by equivalents, without departing from the scope of the present invention.

What is claimed is:

1. A mobile terminal for use in a cellular communications network the terminal being adapted to:
   i) if the terminal transmits signals at a power below a maximum uplink transmission power, distributing an available uplink transmission power between different channels according to a first scheme; and
   ii) if the terminal transmits signals at a power exceeding or about to exceed the maximum uplink transmission power, distributing the available uplink transmission power between different channels according to a second scheme different from said first scheme.

2. A terminal according to claim 1, wherein in step ii) the uplink transmission power is distributed according to priorities of the channels.

3. A terminal according to claim 1, wherein in step ii) the available uplink transmission power is distributed such that the transmission power of a channel for packet data is first scaled down.

4. A terminal according to claim 1, wherein in said second scheme the available uplink transmission power is redistributed compared to said first scheme between at least one of the following channels: DPDCH (Dedicated Physical Data Channel), DPCCH (Dedicated Physical Control Channel), E-DPCCH (Enhanced uplink Dedicated Physical Control Channel), E-DPDCH (Enhanced uplink Dedicated Physical Data Channel) and HS-DPCCH (High Speed Dedicated Physical Control Channel).

5. A terminal according to claim 1, wherein the second scheme is applied for transmission in a next slot after the terminal has determined that it is exceeding or is about to exceed the maximum uplink transmission power.

6. A terminal according to claim 1, wherein gain factors are used to define the distribution of the available uplink transmission power between different channels in said first and second schemes.

7. A terminal according to claim 6, wherein at least one of said gain factors of said second scheme is different from a corresponding gain factor of said first scheme.

8. A terminal according to claim 7, wherein said one gain factor defines the uplink transmission power distribution between the DPCCH and the HS-DPCCH.

9. A terminal according to claim 1, wherein the terminal is adapted to receive one or more parameters relating to said second scheme from a network element of said communications network.

10. A terminal according to claim 9, wherein the terminal is adapted to determine with said one or more parameters one or more gain factors for the second scheme different from one or more gain factors of the first scheme.

11. A network element of a cellular communications network, the network element being adapted to determine one or more parameters defining a distribution of uplink transmission power between different channels if a maximum uplink transmission power is exceeded or about to exceeded, wherein at least one of said parameters are different from parameters defining the distribution if the maximum uplink transmission power is not exceeded.

12. A network element according to claim 11, wherein said one or more parameters includes first parameters used to determine a second parameter defining the uplink transmission power distribution between a DPCCH (Dedicated Physical Control Channel), an E-DPDCH (Enhanced uplink Dedicated Physical Data Channel) and an HS-DPCCH (High Speed Dedicated Physical Control Channel).

13. A network element according to claim 11, wherein the network element is adapted to signal said one or more first parameters via one or more other network elements to mobile terminals.

14. A method for data transmission in a communication system, comprising steps of:
   distributing transmission powers of channels transmitted by a first transceiver side;
   monitoring whether a total transmission power of the first transceiver exceeds a maximum transmission power, where the total transmission power of the first transceiver is a sum of transmission powers of each of the channels;
   re-distributing transmission powers of the channels by scaling down a transmission power of a channel having a low priority, when the total transmission power of the first transceiver exceeds the maximum transmission power; and
   transmitting the channels to a second transceiver side through the re-distributed transmission powers.

15. The method of claim 14, wherein the transmission power of the channel having a low priority is scaled down by setting a gain factor representative of a lower transmission power.

16. The method of claim 15, wherein the gain factor representative of the lower transmission power is signaled by the second transceiver side.

17. The method of claim 14, wherein re-distributing the transmission powers is performed per slot.

18. The method of claim 14, wherein a priority of a voice channel is higher than a priority of a packet data channel.

19. The method of claim 14, wherein a priority of a control channel is higher than a priority of a packet data channel.

20. The method of claim 14, wherein the channel is a High Speed-Dedicated Physical Control Channel (HS-DPCCH).

21. The method of claim 14, wherein the channel is an Enhanced uplink Dedicated Physical Data Channel (E-DPDCH) or an Enhanced uplink Dedicated Physical Control Channel (E-DPCCH).

* * * * *